(12) United States Patent
Masuda et al.

(10) Patent No.: US 8,720,191 B2
(45) Date of Patent: May 13, 2014

(54) DIESEL ENGINE

(75) Inventors: Hiroshi Masuda, Osaka (JP); Michihiko Hara, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 326 days.

(21) Appl. No.: 13/060,988

(22) PCT Filed: Jun. 5, 2009

(86) PCT No.: PCT/JP2009/060353
§ 371 (c)(1),
(2), (4) Date: Apr. 1, 2011

(87) PCT Pub. No.: WO2010/024012
PCT Pub. Date: Mar. 4, 2010

(65) Prior Publication Data
US 2011/0173958 A1    Jul. 21, 2011

(30) Foreign Application Priority Data
Aug. 26, 2008  (JP) ................................. 2008-217445

(51) Int. Cl.
*F01N 3/00*  (2006.01)

(52) U.S. Cl.
USPC .................... 60/295; 60/285; 60/297; 60/311

(58) Field of Classification Search
USPC .................................. 60/285, 295, 297, 311
See application file for complete search history.

(56) References Cited

U.S. PATENT DOCUMENTS

| | | | |
|---|---|---|---|
| 6,951,100 B2 * | 10/2005 | Kuboshima et al. | 60/311 |
| 6,952,919 B2 * | 10/2005 | Otake et al. | 60/297 |
| 7,340,884 B2 * | 3/2008 | Matsuno et al. | 60/295 |
| 7,484,360 B2 * | 2/2009 | Tominaga | 60/295 |
| 7,614,218 B2 * | 11/2009 | Akagawa | 60/295 |
| 7,845,165 B2 * | 12/2010 | Satou et al. | 60/295 |
| 8,209,962 B2 * | 7/2012 | Sun et al. | 60/295 |
| 8,302,386 B2 * | 11/2012 | Tsukada et al. | 60/295 |

FOREIGN PATENT DOCUMENTS

| | | |
|---|---|---|
| EP | 1 785 605 A2 | 5/2007 |
| GB | 2 344 059 A | 5/2000 |
| GB | 2 417 793 A | 3/2006 |
| JP | 2001-280121 A | 10/2001 |

(Continued)

OTHER PUBLICATIONS

International Search Report for PCT/JP2009/060353, Japanese Patent Office, mailed Jul. 28, 2009, 4 pages.

(Continued)

*Primary Examiner* — Binh Q Tran
(74) *Attorney, Agent, or Firm* — Sterne, Kessler, Goldstein & Fox P.L.L.C.

(57) ABSTRACT

An object is to provide a diesel engine that eliminates discomfort when an operator of a working, machine coupled to the diesel engine is at work while a particulate filter is being regenerated. A diesel engine includes an exhaust emission purifier and selecting means capable of selecting any one control method from isochronous control and droop control. The exhaust emission purifier includes a particulate filter and a pressure regulation valve. The particulate filter is disposed along an exhaust stream to purify exhaust gas. The pressure regulation valve is configured to apply a load onto the diesel engine so as to raise a temperature of the particulate filter so that a particulate accumulable in the particulate filter is forcibly removed and that the particulate filter is regenerated. The selecting means is configured to select the isochronous control to control the diesel engine when the load is applied by the pressure regulation valve.

3 Claims, 6 Drawing Sheets

(56) References Cited

FOREIGN PATENT DOCUMENTS

| | | |
|---|---|---|
| JP | 2007-071113 A | 3/2007 |
| JP | 2007-332906 A | 12/2007 |
| JP | 2008-088858 A | 4/2008 |
| JP | 2008-190463 A | 8/2008 |
| WO | WO 2007/052658 A1 | 5/2007 |

OTHER PUBLICATIONS

Supplementary European Search Report for European Application No. EP 09 80 9667, European Patent Office, mailed Jun. 20, 2012, 4 pages.

* cited by examiner

DIESEL ENGINE

TECHNICAL FIELD

The present invention relates to a technique regarding diesel engines, and more particularly, to a technique regarding a diesel engine having an exhaust emission purifier.

BACKGROUND ART

Conventionally, as a technique to trap particulates contained in exhaust gas discharged from a diesel engine, a technique has been known that an engine exhaust emission purifier including a particulate filter is equipped along an exhaust stream of a diesel engine. The particulate filter has a porous honeycomb structure made of ceramics or other material, and the particulate filter has a configuration in which inlets of respective flow paths defined in a lattice form are alternately sealed up while outlets of flow paths whose inlets are unsealed are sealed up, to discharge only exhaust gas that has permeated through porous walls defining the respective flow paths to a down-stream.

Exhaust gas is purified such that particulates in the exhaust gas are trapped inside the porous walls when the exhaust gas permeates through the porous walls. Meanwhile, since the particulates are accumulated inside the porous walls, an increase in exhaust resistance and a rise in differential pressure between the inlet side and outlet side of the particulate filter occur to exert adverse effects on performance of the diesel engine. In view of this, a technique to combust and remove particulates before the particulate filter is brought into such a state is known.

However, there has been a problem in that particulates are not combusted and removed when the load of the diesel engine is low and the temperature of an exhaust gas is low.

Then, a technique is known that particulates accumulated in a particulate filter are removed to recover the particulate trapping capability of the particulate filter, in other words, to regenerate the particulate filter. For example, a technique is known that an electrothermal heater is provided on an upper-stream side of an oxidation catalyst-loaded filter along an exhaust stream of a diesel engine, to raise the temperature of exhaust gas introduced to the oxidation catalyst-loaded filter by heating with the heater (see Patent document 1).

[Patent Document 1] Japanese Unexamined Patent Application Publication No. 2001-280121.

DISCLOSURE OF THE INVENTION

Problems to be Solved by the Invention

Further, as a technique to regenerate the particulate filter, there is a technique by which the load of a working machine such as a working-machine hydraulic pump is increased by applying thereto a regeneration load, to raise the exhaust gas temperature and thus to remove particulates. However, the rotational speed of the engine drops when the regeneration load is applied, occasionally causing discomfort on the part of an operator while at work.

In view of the above-described problems, the present invention provides a diesel engine including an engine exhaust emission purifier having a particulate filter along an exhaust stream of the exhaust emission purifier; specifically, a diesel engine that eliminates discomfort when an operator of a working machine coupled to the diesel engine is at work while the particulate filter is being regenerated.

Means of Solving the Problems

The problems to be solved by the present invention have been described hereinabove, and subsequently, means of solving the problems are described.

According to an embodiment recited in claim 1, a diesel engine includes an exhaust emission purifier and control means capable of selecting any one control method from isochronous control and droop control. The exhaust emission purifier includes a particulate filter and a regeneration load apparatus. The particulate filter is disposed along an exhaust stream to purify exhaust gas. The regeneration load apparatus is configured to apply a load onto the diesel engine so as to raise a temperature of the particulate filter so that a particulate accumulable in the particulate filter is forcibly removed and that the particulate filter is regenerated. The control means is configured to select the isochronous control to control the diesel engine when the load is applied by the regeneration load apparatus.

According to another embodiment recited in claim 2, on a map showing a relationship between an engine rotational speed and an engine load of the diesel engine, a minimum engine rotational speed among engine rotational speeds that reach a regeneration enabling area when a maximum engine load is applied is set as a minimum regeneration-enabling rotational speed. When the engine rotational speed is lower than the minimum regeneration-enabling rotational speed, no load is applied by the regeneration load apparatus.

According to still another embodiment recited in claim 3, on a map showing a relationship between an engine rotational speed and an engine load of the diesel engine, when there is a possibility of a rise in load in excess of a maximum torque line if a load is applied by the regeneration load apparatus, no load is applied by the regeneration load apparatus.

Effects of the Invention

The embodiments of the present invention provide the following advantageous effects.

According to the embodiment recited in claim 1, it is possible to regenerate the particulate filter without exerting any effect on workability of the diesel engine, and thus to eliminate discomfort when an operator is at work.

According to the embodiment recited in claim 2, under the isochronous control, no unnecessary regeneration load is applied in a low rotational range of the diesel engine below the regeneration enabling area, making it possible to prevent unnecessary consumption of fuel.

According to the embodiment recited in claim 3, when the maximum torque line is exceeded by application of the regeneration load, no regeneration load is applied, making it possible to prevent an occurrence of engine stall unexpected by an operator.

BEST MODE FOR CARRYING OUT THE INVENTION

Next, embodiments of the present invention will be described.

Figure 1:
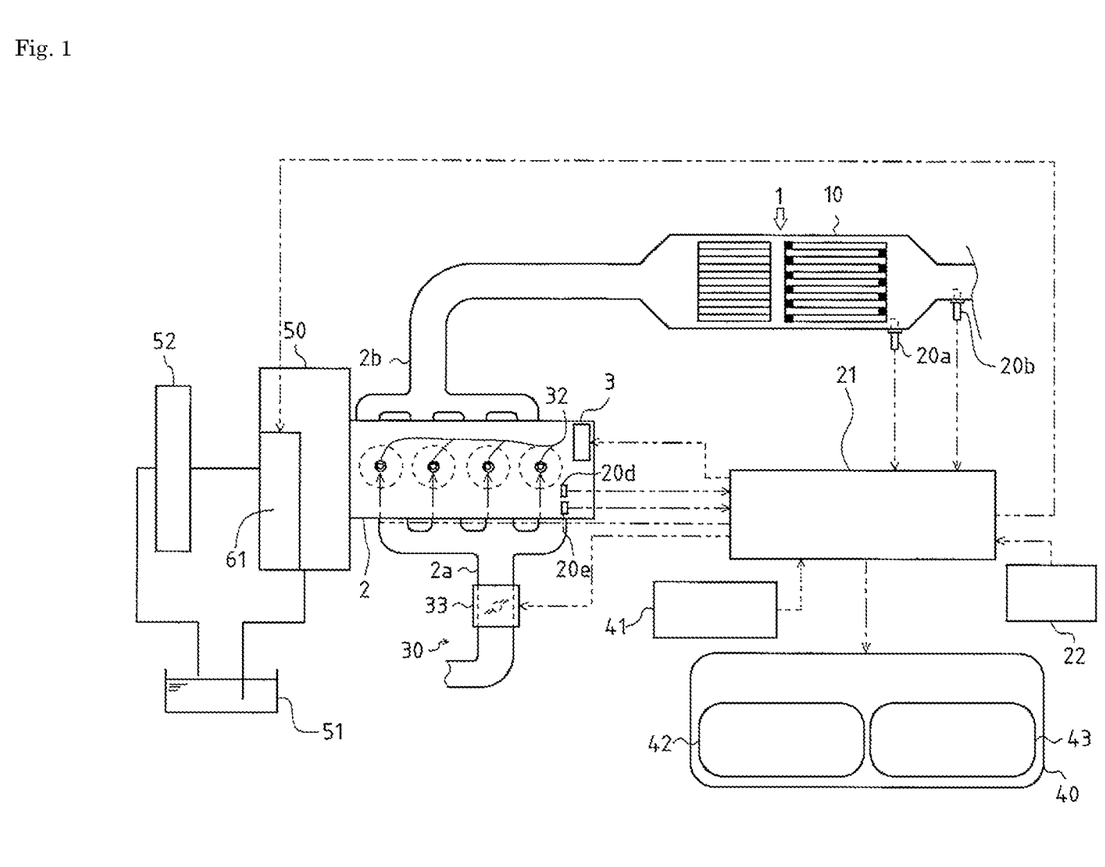
FIG. 1 is a functional block diagram illustrating a general arrangement of a diesel engine and an exhaust emission purifier according to one embodiment of the present invention.
Figure 2:
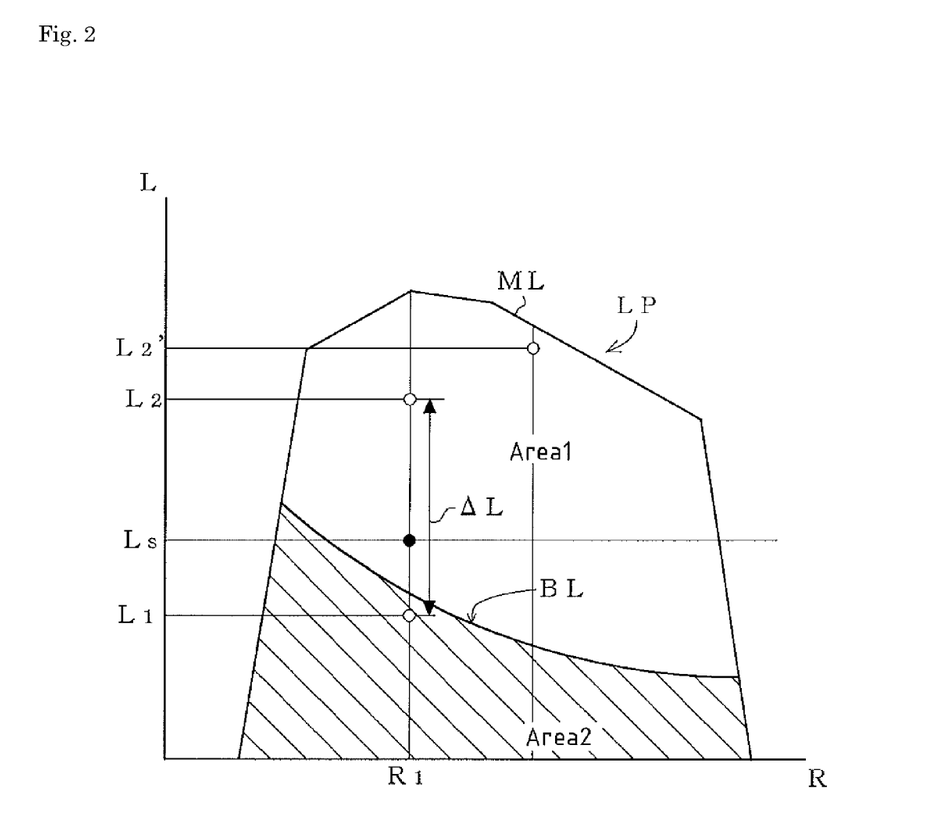
FIG. 2 is a diagram illustrating a relationship between engine load and engine rotational speed.
Figure 3:
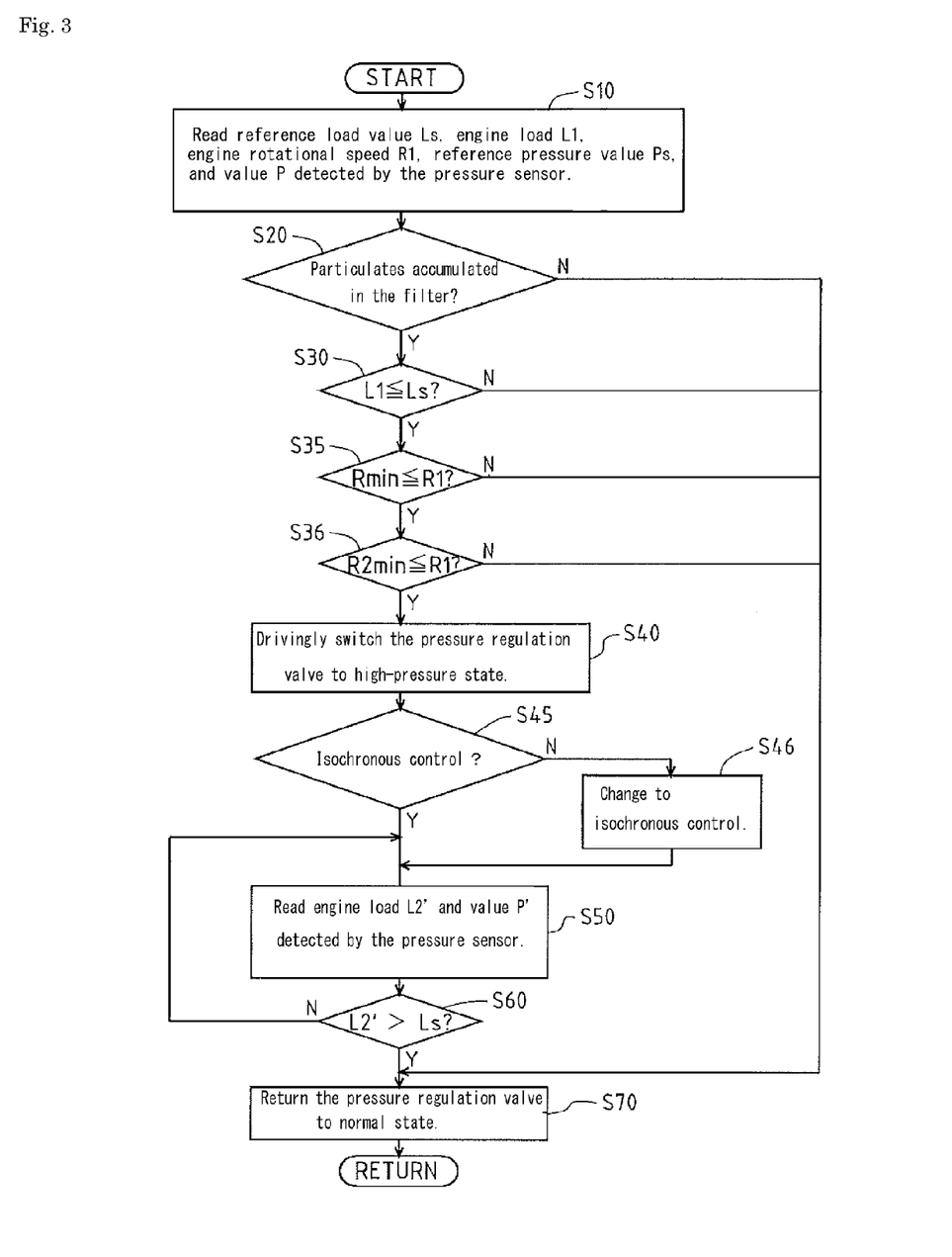
FIG. 3 is a flowchart of filter regeneration control.
Figure 4:
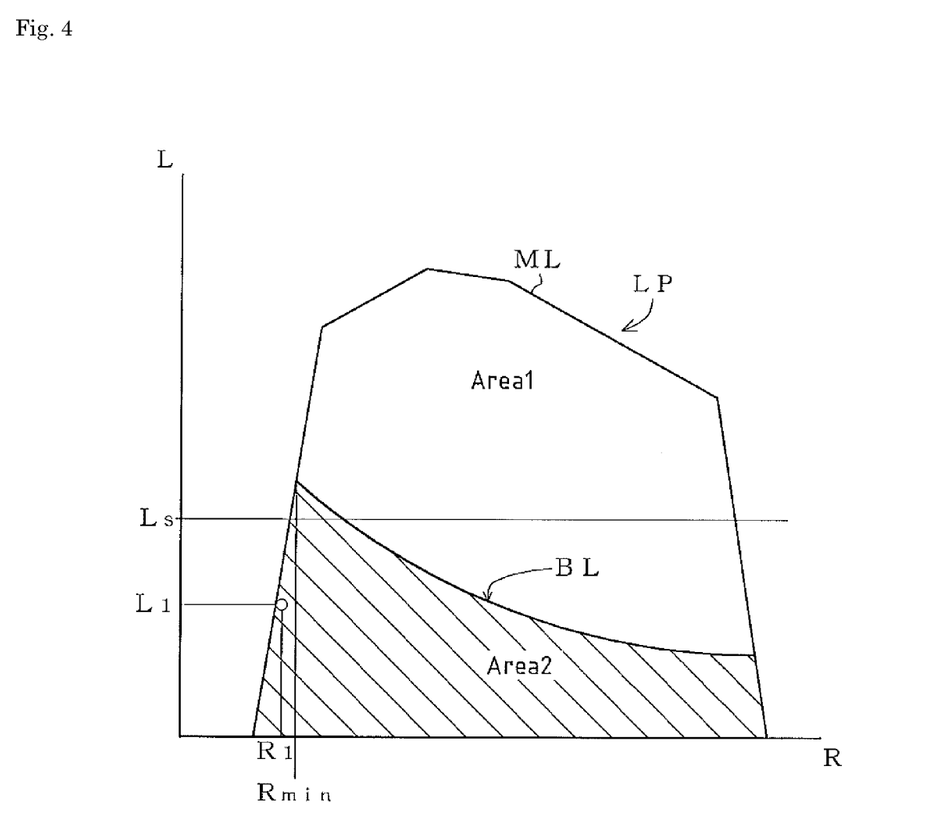
FIG. 4 is a diagram illustrating a relationship between engine load and engine rotational speed.
Figure 5:
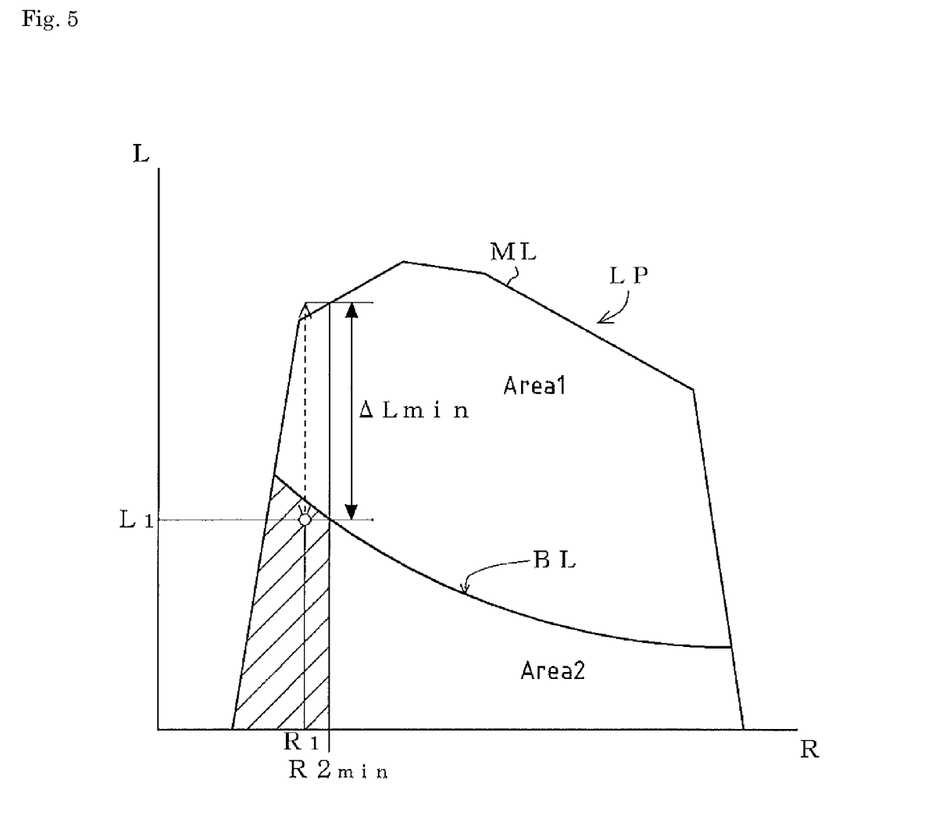
FIG. 5 is a diagram illustrating a relationship between engine load and engine rotational speed.
Figure 6:
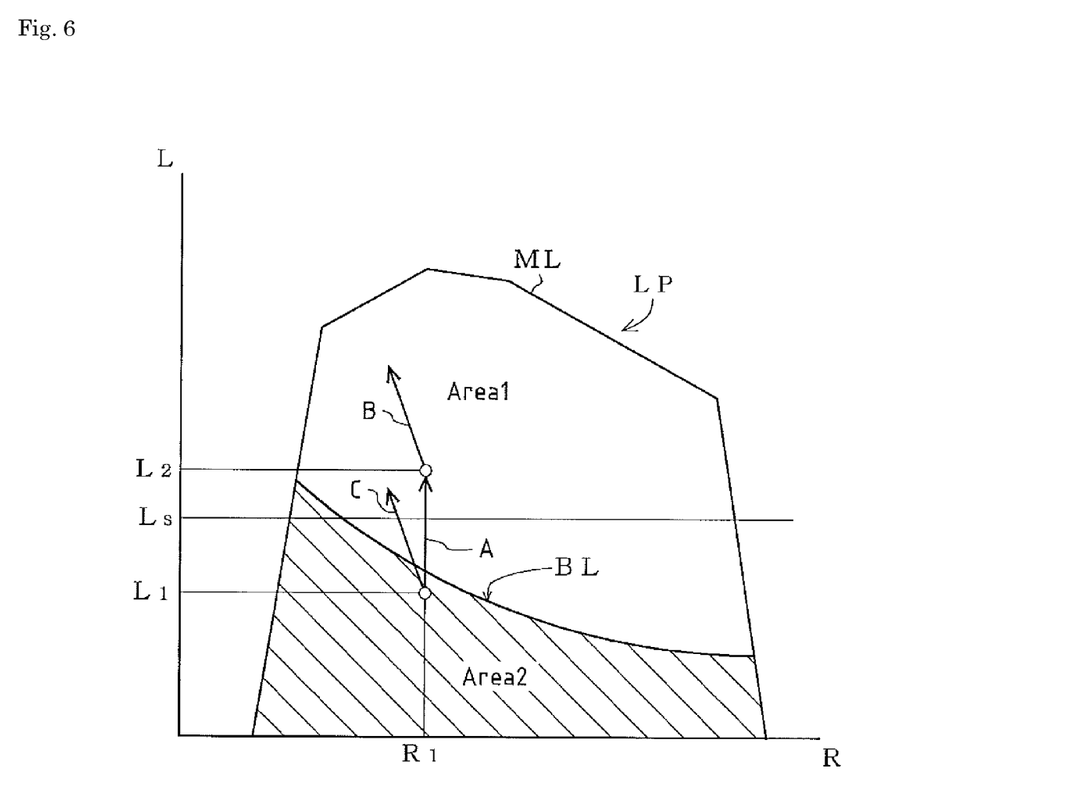
FIG. 6 is a diagram illustrating a relationship between engine load and engine rotational speed.

FIG. 1 is a functional block diagram illustrating a general arrangement of a diesel engine and an exhaust emission purifier according to one embodiment of the present invention. FIG. 2 is a diagram illustrating a relationship between engine load and engine rotational speed. FIG. 3 is a flowchart of filter regeneration control. FIG. 4 is a diagram illustrating a relationship between engine load and engine rotational speed. FIG. 5 is a diagram illustrating a relationship between engine load and engine rotational speed. FIG. 6 is a diagram illustrating a relationship between engine load and engine rotational speed.

[Configuration of the Exhaust Emission Purifier]

As shown in FIG. 1, a diesel-engine exhaust emission purifier 1 is included in a diesel engine 2 that is one embodiment of a diesel engine according to the present invention. The exhaust emission purifier 1 purifies exhaust gas generated in the diesel engine 2 and to discharge the purified gas.

The diesel-engine exhaust emission purifier 1 includes a particulate filter 10, detecting means 20, a controller 21, notifying means 40, and other elements.

The particulate filter 10 is provided along an exhaust stream 2b of the diesel engine 2 to remove particulates (carbonaceous soot, high-boiling point hydrocarbon component (SOF), and other substances) contained in exhaust gas. Specifically, the particulate filter 10 has a honeycomb structure including porous walls of ceramics or other material to assure that exhaust gas is discharged after permeating through the porous walls. When the exhaust gas passes through the porous walls, particulates in the exhaust gas are trapped inside the porous walls. As a result, the particulates are removed from the exhaust gas.

The detecting means 20 detects exhaust pressures on the upper-stream side and the down-stream side of the particulate filter 10, the discharge temperature, and other parameters. Specifically, the detecting means 20 includes a pressure sensor 20a provided on the outlet side of the particulate filter 10, a temperature sensor 20b to detect the exhaust gas temperature of the particulate filter 10, an engine rotation sensor 20d to detect the engine rotational speed, a rack position sensor 20e to detect the amount of fuel injection, and other sensors. The detecting means 20 is coupled to the controller 21.

The controller 21 is coupled to a governor 3, the detecting means 20, notifying means 40, selecting means 41, a pressure regulation valve 61 serving as a regeneration load apparatus, which will be described later, an engine control unit, and other elements. The controller 21 mainly includes a storage unit 22, an operating unit, and other units, and the storage unit 22 includes a ROM that stores types of control programs, a RAM used as a working area for data storage and for executing the programs, and other elements.

The controller 21 carries out operations for the degree of fullness of the particulate filter 10 from a pressure and other parameters of the particulate filter 10 detected by the detecting means 20, so as to determine whether particulates accumulated in the particulate filter 10 should be removed.

Fuel injection valves 32 include electromagnetic valves or other valves, and inject fuel directly into a plurality of cylinders arranged in the diesel engine 2. The timing of fuel injection into the cylinders is changed by opening and closing the fuel injection valves 32 to enable changes in rotational speed, torque, and other parameters, and to enable changes in exhaust temperature and enable supply of unburned fuel to exhaust gas.

An intake throttle valve 33 includes an electromagnetic valve or a valve element opened and closed by an actuator, and is provided along an intake stream 2a of the diesel engine 2 to adjust the air inflow volume into the diesel engine 2. By changing the openness of the intake throttle valve 33, it is possible to change the exhaust flow volume, exhaust temperature, and exhaust rate of exhaust gas.

The notifying means 40 is means for notifying of whether the particulate filter 10 is being regenerated, and makes such notification before the regeneration starts, make a notification regarding a regeneration method, and make other notification. The notifying means 40 includes visual notifying means 42 such as a monitor, or acoustic notifying means 43 such as a speaker. The notifying means 40 is coupled to the controller 21.

Further, the diesel engine 2 is provided with a working-machine hydraulic pump 50 driven by rotational energy of an output shaft of the diesel engine 2. The working-machine hydraulic pump 50 supplies hydraulic oil to a working-machine hydraulic circuit 52 arranged in hydraulic equipment such as a hydraulic elevating mechanism.

It is noted that the diesel engine 2 may be attached with, for example, an electric generator, a heat pump, or another mechanism in place of the working-machine hydraulic pump 50.

As shown in FIG. 1, a suction side of the working-machine hydraulic pump 50 is coupled to a hydraulic oil tank 51, and a discharge side of the working-machine hydraulic pump 50 is coupled to the working-machine hydraulic circuit 52 via the pressure regulation valve 61, which serves as a regeneration load apparatus described later.

The pressure regulation valve 61 keeps, at constant levels, the pressure and flow volume on the side of the working-machine hydraulic circuit 52 and to switch the pressure on the side of the working-machine hydraulic pump 50. The pressure regulation valve 61 drivingly switches between a normal state in which there is no rise in pressure on the side of the working-machine hydraulic pump 50 and a high-pressure state in which the pressure on the side of the working-machine hydraulic pump 50 is increased by a predetermined level.

When the pressure regulation valve 61 is switched to the high-pressure state, in which the pressure on the side of the working-machine hydraulic pump 50 is increased by a predetermined level, then the discharge pressure of the working-machine hydraulic pump 50 is increased and the engine load is increased according to the increase in discharge pressure. That is, pressure regulation by the pressure regulation valve 61 increases the discharge pressure of the working-machine hydraulic pump 50 and thus increases the engine load, making it possible to execute filter regeneration control.

Next, the control of the diesel engine 2 will be described.

The term isochronous control refers to such control that increases the engine load while keeping the rotational speed constant when a load is applied onto the working-machine hydraulic pump 50. Performing the isochronous control keeps the rotational speed from reducing at the time of working, making it possible to retain the working performance and to eliminate adverse effects on work that requires constant rotation.

The term droop control refers to such control that increases the engine load while reducing the rotational speed when a load is applied onto the working-machine hydraulic pump 50.

Performing the droop control causes the rotational speed to reduce according to a rise in engine load and finally steady down to a constant rotational speed, thereby eliminating discomfort on the part of the operator.

The selecting means 41, which is capable of selecting any one control method from the isochronous control and the droop control, and the governor 3, which switches between the isochronous control and the droop control, are coupled to the controller 21. With such a configuration, the diesel engine 2 can be controlled by a control method selected by the selecting means 41 during normal work. Specifically, when the isochronous control is selected by the selecting means 41, the controller 21 controls the governor 3 under the isochronous control. When the droop control is selected by the selecting means 41, the controller 21 controls the governor 3 under the droop control.

Next, switching on-and-off of the pressure regulation valve 61 and switching to the isochronous control or the droop control will be described.

[Filter Regeneration Control]

Next, one example of the filter regeneration control will be described referring to FIGS. 2 and 3. It is noted that a reference load Ls, which serves as a trigger for activation of the pressure regulation valve 61, is set in advance by, for example, being stored in a storage unit 22 of the controller 21.

The diagram shown in FIG. 2 is a diagram of a load pattern illustrating a relationship between engine rotational speed and engine load at the time of driving of the diesel engine 2, and the load pattern is stored in the storage unit 22. In FIG. 2, an engine rotational speed R is plotted on the horizontal axis while an engine load L that is correlated with a rack position is plotted on the vertical axis. In this case, a reference load Ls is expressed by a horizontal straight line of L=Ls.

A load pattern LP of the present embodiment is an area defined by a maximum torque line ML that is an upward convex line, and is vertically divided by a boundary line BL that shows a relationship between engine rotational speed R and engine load L at the time when the exhaust gas temperature is at a regeneration enabling temperature. The area above the boundary line BL is a regeneration enabling area Area1 in which particulates accumulated in the filter body can be removed, and the area below the boundary line BL is a regeneration disabling area Area2 in which particulates are not removed but accumulated in the filter body.

Next, a flow of filter regeneration control using the pressure regulation valve 61 serving as the regeneration load apparatus will be described referring to a flowchart shown in FIG. 3. First, the reference load Ls stored in advance in the storage unit 22, an engine load L1 that is a value detected by the rack position sensor 20e, an engine rotational speed R1 that is a value detected by the engine rotation sensor 20d, a reference pressure value Ps stored in advance in the storage unit 22, and a value P detected by the pressure sensor 20a are read (step S10). Then, it is determined whether particulates are accumulated in the particulate filter 10 to an extent that is detrimental to the engine output, judging from largeness or smallness of the pressure difference between the reference pressure value Ps and the detected value P of the pressure sensor 20a (step S20).

When no particulates are accumulated in the particulate filter 10, the control is terminated. When particulates are accumulated in the particulate filter 10, the distribution resistance inside the particulate filter 10 is increased to cause a reduction in engine output. Then, it is determined whether the current engine load L1 is equal to or lower than the reference load Ls (step S30).

When the current engine load L1 is greater than the reference load Ls, there is a high possibility that the engine load L1 is within the regeneration enabling area Area1, and therefore, the control is terminated. When the current engine load L1 is equal to or lower than the reference load Ls, there is a high possibility that the current engine load L1 is within the regeneration disabling area Area2, which is considered as a state in which particulates are not removed but accumulated in the particulate filter 10.

Next, it is determined whether the current engine rotational speed R1 at its corresponding maximum engine load applied is within such a range that the regeneration enabling area Area1 is not reached. Specifically, a minimum rotational speed among engine rotational speeds at which the regeneration enabling area Area1 is reached when the maximum engine load is applied is set as a minimum regeneration-enabling rotational speed Rmin. Then, it is determined whether the current engine rotational speed R1 is equal to or higher than the minimum regeneration-enabling rotational speed Rmin (step S35). As shown in FIG. 4, when the current engine rotational speed R1 is lower than the minimum regeneration-enabling rotational speed Rmin, the regeneration enabling temperature is not exceeded in any case no matter how much the engine load L is increased. In view of this, in such a case, the engine load L is not increased and the control is terminated. With such a configuration, under the isochronous control, no unnecessary regeneration load ΔL is applied in a low rotational range of the diesel engine 2 that falls short of the regeneration enabling area Area1, making it possible to prevent unnecessary consumption of fuel.

Next, it is determined whether the current engine rotational speed R1 at its corresponding minimum regeneration load ΔLmin applied is within such a range that a maximum allowable load for the current engine rotational speed R1 is not exceeded. Specifically, a minimum rotational speed among engine rotational speeds at which the maximum allowable load is not exceeded when the minimum regeneration load ΔLmin for the current rotational speed R1 is applied is set as a minimum regeneration load allowable rotational speed R2 min. Then, it is determined whether the current engine rotational speed R1 is equal to or higher than the minimum regeneration load allowable rotational speed R2 min (step S36). As shown in FIG. 5, when the current engine rotational speed R1 is lower than the regeneration load allowable rotational speed R2 min, the engine load exceeds the maximum torque line ML when the minimum regeneration load ΔLmin is applied, which causes the diesel engine 2 to stop. With such a configuration, it is possible to prevent an occurrence of engine stall unexpected by an operator. It is noted that Rmin=R2 min is possible in some cases depending the way the regeneration load ΔL is applied.

When the current engine rotational speed R1 is equal to or higher than the minimum regeneration-enabling rotational speed Rmin, which is in FIG. 4, and is equal to the minimum regeneration load allowable rotational speed R2 min, which is in FIG. 5, then the controller 21 excites an electromagnetic solenoid, which is not shown, to drivingly switch the pressure regulation valve 61 to the high-pressure state (step S40).

Next, it is determined whether the current control method of the diesel engine 2 is the isochronous control (step S45). When the isochronous control is selected by the selecting means 41, the processing proceeds to step S50. When the droop control is selected by the selecting means 41, the control method of the diesel engine 2 is forcibly transferred to the isochronous control.

That is, the control of the diesel engine 2 when the engine load is applied by the pressure regulation valve 61 serving as the regeneration load apparatus is set at the isochronous control. With such a configuration, even when the engine load L is increased, the engine rotational speed R is constant as shown by an arrow A in FIG. 6. Therefore, it is possible to regenerate the particulate filter 10 without exerting any adverse effects on workability of the diesel engine as compared with the case of the droop control shown by an arrow C in FIG. 6.

Further, when a normal load is applied onto a working machine while at the same time the engine load L is applied by the pressure regulation valve 61 serving as the regeneration load apparatus, it is possible to increase the engine load L while reducing the engine rotational speed R as shown by an arrow B in FIG. 6. With such a configuration, after the rotational speed is reduced, this reduced level of rotational speed is retained, thereby eliminating discomfort on the part of the operator.

By drivingly switching the pressure regulation valve 61 to the high-pressure state, the regeneration load ΔL is applied onto the working-machine hydraulic pump 50 to increase the discharge pressure of the working-machine hydraulic pump 50. Then, with the increase in discharge pressure of the working-machine hydraulic pump 50, the engine load L1 increases by the regeneration load ΔL corresponding to the predetermined pressure to exceed the boundary line BL, resulting in an engine load L2 (L2=L1+ΔL). Accordingly, the engine output is increased in order to retain a set rotational speed, and thus the exhaust gas temperature is raised. Further, since only the engine load is increased and the rotational speed R1 is kept constant, the rotational speed is kept from reducing at the time of working and the working performance is retained, making it possible to eliminate adverse effects on work that requires constant rotation.

As a result, when the exhaust gas passes through the particulate filter 10, the exhaust gas temperature exceeds the regeneration enabling temperature; thus, the particulates accumulated in the particulate filter 10 are removed, thereby recovering the particulate trapping capability of the particulate filter 10.

After the pressure regulation valve 61 is drivingly switched to the high-pressure state, a value L2' detected by the rack position sensor 20e and a value P' detected by the pressure sensor 20a are again read (step S50). Then, it is determined whether the engine load L2' exceeds the reference load Ls (step S60).

When the engine load L2' does not exceed the reference load Ls, the processing returns to step S50 in order to continue the pressure regulation by the pressure regulation valve 61. When the engine load L2' exceeds the reference load Ls, this is considered as a state of high possibility that the regeneration enabling area Area1 is reached without the regeneration load ΔL but with a sum of loads required for driving, for example, a power steering mechanism alone. In view of this, in order to release the increase in discharge pressure of the working-machine hydraulic pump 50 by the pressure regulation valve 61, the pressure regulation valve 61 is drivingly switched to the normal state (step S70).

With such control, since the discharge pressure of the working-machine hydraulic pump 50 is increased by pressure regulation by the pressure regulation valve 61 based on the detected information of the pressure sensor 20a, the engine load is increased to result in a rise in exhaust gas temperature. Therefore, for example, even in a state in which the current engine load L1 is in the regeneration disabling area Area2, where particulates are not removed but accumulated in the particulate filter 10, it is possible to raise the exhaust gas temperature to or higher than the regeneration enabling temperature to remove the particulates. Thus, it is possible to recover the particulate trapping capability of the filter body regardless of the driving state of the diesel engine 2.

Further, the pressure regulation valve 61, which regulates the discharge pressure of the working-machine hydraulic pump 50, is activated when the engine load is equal to or lower than the reference load Ls. Thus, for example, in a state in which the current engine load L1 is in the regeneration enabling area Area1, where particulates accumulated in the particulate filter 10 are unconditionally removed, the pressure regulation valve 61 is maintained at the normal state, and no excessive load is applied onto the diesel engine 2 from the working-machine hydraulic pump 50 in any case. That is, it is possible to inhibit deterioration of fuel consumption in association with the filter regeneration control.

Moreover, when the engine load L exceeds the reference load Ls, the pressure regulation by the pressure regulation valve 61 is released. Therefore, no excessive load is applied onto the diesel engine 2 due to the load on the working-machine hydraulic pump 50. Accordingly, it is possible to reliably inhibit an occurrence of engine stall due to the regeneration load ΔL on the working-machine hydraulic pump 50, while it is also possible to reduce energy loss to efficiently utilize the engine output.

As described above, in the diesel engine 2 that includes the exhaust emission purifier 1 and the selecting means 41 capable of selecting any one control method from the isochronous control and the droop control, the exhaust emission purifier 1 includes the particulate filter 10 disposed along the exhaust stream to purify exhaust gas, and the pressure regulation valve 61 to apply a load onto the diesel engine 2 so as to raise the temperature of the particulate filter 10 so that particulates accumulated in the particulate filter are forcibly removed. The selecting means 41 selects the isochronous control to control the diesel engine 2 when the load is applied by the pressure regulation valve 61. With such a configuration, it is possible to regenerate the particulate filter 10 without exerting any adverse effects on workability of the diesel engine, and thus to eliminate discomfort when an operator is at work.

Further, when a minimum rotational speed among engine rotational speeds that reach the regeneration enabling area Area1 when a maximum engine load is applied is set as the minimum regeneration-enabling rotational speed Rmin, and when the engine rotational speed R1 is lower than the minimum regeneration-enabling rotational speed Rmin, no load is applied by the pressure regulation valve 61. With such a configuration, under the isochronous control, no unnecessary regeneration load ΔL is applied when the diesel engine 2 is in a low rotational range at which the regeneration enabling area Area1 is not reached, making it possible to prevent unnecessary consumption of fuel.

Further, on a map showing a relationship between the engine rotational speed R and the engine load L of the diesel engine 2, when there is a possibility of a rise in load in excess of the maximum torque line ML if a load is applied by the pressure regulation valve 61, no load is applied by the pressure regulation valve 61. With such a configuration, when the load exceeds the maximum torque line ML upon application of the regeneration load ΔL, no regeneration load ΔL is applied, making it possible to prevent an occurrence of engine stall unexpected by an operator.

INDUSTRIAL APPLICABILITY

The present invention is applicable to diesel engines having exhaust emission purifiers.

The invention claimed is:

1. A diesel engine comprising:
an exhaust emission purifier; and
a control means configured to select a control method from isochronous control and droop control,
wherein isochronous control increases a load on the diesel engine while keeping a rotational speed, of the diesel engine constant,
wherein droop control increases the load on the diesel engine while reducing the rotation speed of the diesel engine,
wherein the exhaust emission purifier comprises
    a particulate filter disposed along an exhaust stream to purify exhaust gas, and
    a regeneration load apparatus configured to apply the load onto the diesel engine so as to raise a temperature of the particulate filter so that a particulate accumulable in the particulate filter is forcibly removed and that the particulate filter is regenerated, and
wherein the control means is configured to select the isochronous control to control the diesel engine when the load is applied by the regeneration load apparatus.

2. A diesel engine comprising:
an exhaust emission purifier; and
control means configured to select a control method from isochronous control and droop control,
wherein the exhaust emission purifier comprises
    a particulate filter disposed along an exhaust stream to purify exhaust gas, and
    a regeneration load apparatus configured to apply a load onto the diesel engine so as to raise a temperature of the particulate filter so that a particulate accumulable in the particulate filter is forcibly removed and that the particulate filter is regenerated,
wherein the control means is configured to select the isochronous control to control the diesel engine when the load is applied by the regeneration load apparatus,
wherein on a map showing a relationship between an engine rotational speed and an engine load of the diesel engine, a minimum engine rotational speed among engine rotational speeds that reach a regeneration enabling area when a maximum engine load is applied is set as a minimum regeneration-enabling rotational speed, and
wherein when the engine rotational speed is lower than the minimum regeneration-enabling rotational speed, no load is applied by the regeneration load apparatus.

3. The diesel engine according to claim 1, wherein on a map showing a relationship between an engine rotational speed and an engine load of the diesel engine, when there is a possibility of a rise in load in excess of a maximum torque line if a load is applied by the regeneration load apparatus, no load is applied by the regeneration load apparatus.

* * * * *